(12) United States Patent
Su

(10) Patent No.: US 7,097,556 B2
(45) Date of Patent: Aug. 29, 2006

(54) POWER SUPPLY CAPABLE OF DISSIPATING HEAT FROM COMPUTER UNIT

(75) Inventor: Steven Su, Taoyuan (TW)

(73) Assignee: Enermax Technology Corporation, Taoyuan (TW)

( * ) Notice: Subject to any disclaimer, the term of this patent is extended or adjusted under 35 U.S.C. 154(b) by 0 days.

(21) Appl. No.: 10/896,035

(22) Filed: Jul. 22, 2004

(65) Prior Publication Data

US 2006/0019596 A1 Jan. 26, 2006

(51) Int. Cl.
*H05K 7/20* (2006.01)

(52) U.S. Cl. ...................... 454/184; 361/695
(58) Field of Classification Search ............... 454/184; 361/695
See application file for complete search history.

(56) References Cited

U.S. PATENT DOCUMENTS 5,474,120 A * 12/1995 Severson et al. ........... 165/296
5,484,012 A * 1/1996 Hiratsuka ................... 165/247
5,726,874 A * 3/1998 Liang ........................ 363/141
6,023,402 A * 2/2000 Kaminski ................... 361/103
6,181,070 B1 * 1/2001 Dunn et al. ................ 315/117
6,665,163 B1 * 12/2003 Yanagisawa ................ 361/103
6,731,502 B1 * 5/2004 Hsu .......................... 361/695

* cited by examiner

*Primary Examiner*—Harold Joyce
(74) *Attorney, Agent, or Firm*—Troxell Law Office, PLLC

(57) ABSTRACT

This invention relates to a power supply capable of dissipating heat from computer unit, for enhancing the heat source heat-dissipating effect within the computer unit, including: a blower for exhausting air provided in or above the power supply. The blower is provided with an adjustment knob extended to and provided at an outside of the power supply or computer casing by means of wires. A power terminal of the blower is connected to a backup power of the power supply, where the backup power is controlled by a surrounding temperature monitoring device to operate the blower continuously after shutting off the computer until surrounding temperature has reached a target value.

7 Claims, 6 Drawing Sheets

POWER SUPPLY CAPABLE OF DISSIPATING HEAT FROM COMPUTER UNIT

CROSS-REFERENCES TO RELATED APPLICATIONS

Not Applicable

STATEMENT REGARDING FEDERALLY SPONSORED RESEARCH OR DEVELOPMENT

Not Applicable

DESCRIPTION

1. Field of the Invention

A power supply dissipates heat from a computer unit, for enhancing heat source heat-dissipating effect within the computer unit.

2. Background

Most electrical or electronic products are equipped with heat generating and heat storage units therein, or possible of generating heat upon executing programs. One of the most commonly seen measures for dissipating heat is by heat conduction in accompaniment with directly blowing a dissipating fan towards the heat dissipating devices or towards the heat source to directly remove the heat source. However, to prevent EMI leakage, the casing of most of the electrical products is made of a metal material in the form of an enclosed space. A certain level of difficulty is thus required for preventing EMI leakage from an enclosed space, that would eventually store heat, and preventing temperature elevation by dissipating the heat as stored at the same time. How to achieve an effective heat dissipating effect has thus become a concern for the manufacture of computer units.

As known, every computer unit is equipped therein with a power supply that primarily coverts AC power into steady DC power of various voltages to serve as the power sources of various components of different current and voltage specifications provided in the computer unit. Both the AC power supply and computer system require a steady and reliable heat dissipating system to assure normal operation of the computer system. Accordingly, most power supplies are provided therein with a heat dissipating fan for reducing the heat generated by the power supply. However, the heat dissipating system equipped within the power supply, generally, serves to dissipate heat source generated by the power supply only, but has insignificant influence on removing the heat source generated within the computer environment.

Due to the increasing high heat generated during operation of the recently developed, high performance computer system, the power supply has been modified from the use of a single fan in the early days into the use of two or more fans, in order to achieve the intended heat-dissipating effect through the use of multiple fans.

Though the addition of a pair of or plural heat dissipating fans this may effectively reduce the heat generated by the power supply, their effects on the heat generated by other components equipped within the computer unit, such as CPU, display chips, and diskette drives, are relatively insignificant, and makes little improvement to the accumulation of the heat source in the computer environment. At the same time, the poor design of the newly added plural pairs of fans may possibly cause other problems, such as turbulences and increased noise.

In view of the drawbacks of the prior art, the applicant of the present invention has developed several inventions (including TW088208613U, U.S. Ser. No. 09/357,642, DE29912922.5; CN200238621.6, DE20011625.8, FR0009168; CN01268112.1; TW20030200163U, CN2003201144.X, DE20301195.3; and TW092208622U, CN2003264493.0, U.S. Ser. No. 10/452,131, DE20308474.8), and based on which the present invention is developed. According to the present invention, a power supply is provided thereto with a blower for exhausting air along a right-angle airflow, wherein airflow generated by the blower does not directly enter into the power supply so as not to affect or increase the temperature of the power supply, but is able to effectively dissipate the heat source within a computer environment heat source. The blower may further be provided with an adjustment knob extended to and provided outside of the power supply or computer casing by means of wires, to serve as a means for adjusting the rotational speed of the blower from the outside. A power terminal of the blower may be connected to a backup power of the power supply, where the backup power is controlled by a surrounding temperature monitoring device to operate the blower continuously after shutting off the computer, for removing residual heat generated by the CPU out of the computer unit, while eliminating the problems of heat-dissipation and noises for the computer unit.

SUMMARY OF THE INVENTION

Accordingly, it is a primary object of the present invention to provide a power supply capable of dissipating heat from a computer unit, for enhancing the heat source heat-dissipating effect within the computer unit, including: a blower for exhausting air along a right-angle airflow provided in or above the power supply, the blower generating an airflow not directly entering into the power supply so as not to affect or increase the temperature of the power supply, but is able to effectively dissipate heat source within a computer environment heat source.

According to another aspect of the present invention, the blower is further provided with an adjustment knob extended to and provided outside of the power supply or computer casing by means of wires, to serve as the means for adjusting the rotational speed of a fan from the outside.

According to yet another aspect of the present invention, the blower further includes a power terminal that is connected to a backup power of the power supply, where the backup power is controlled by a surrounding temperature monitoring device to operate the blower continuously after shutting off the computer, for removing residual heat generated by the CPU out of the computer unit, so as to resolve the problem of excessive residual heat due to instantaneous shutting off of the computer, which would eventually reduce the lifespan of the computer unit.

BRIEF DESCRIPTION OF THE DRAWINGS

These and other modifications and advantages will become even more apparent from the following detained description of a preferred embodiment of the invention and from the drawings in which.

DETAILED DESCRIPTION OF THE INVENTION

Preferred Embodiments

Figure 1:
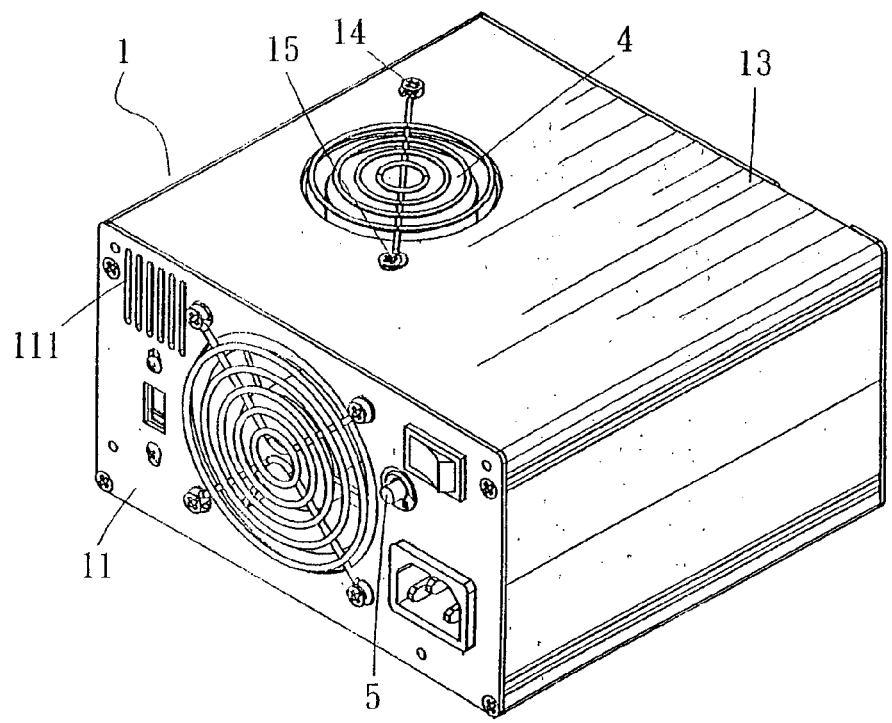
FIG. 1 is a rear, bottom perspective view of the power supply capable of dissipating heat from the computer unit according to the present invention.
Figure 2:
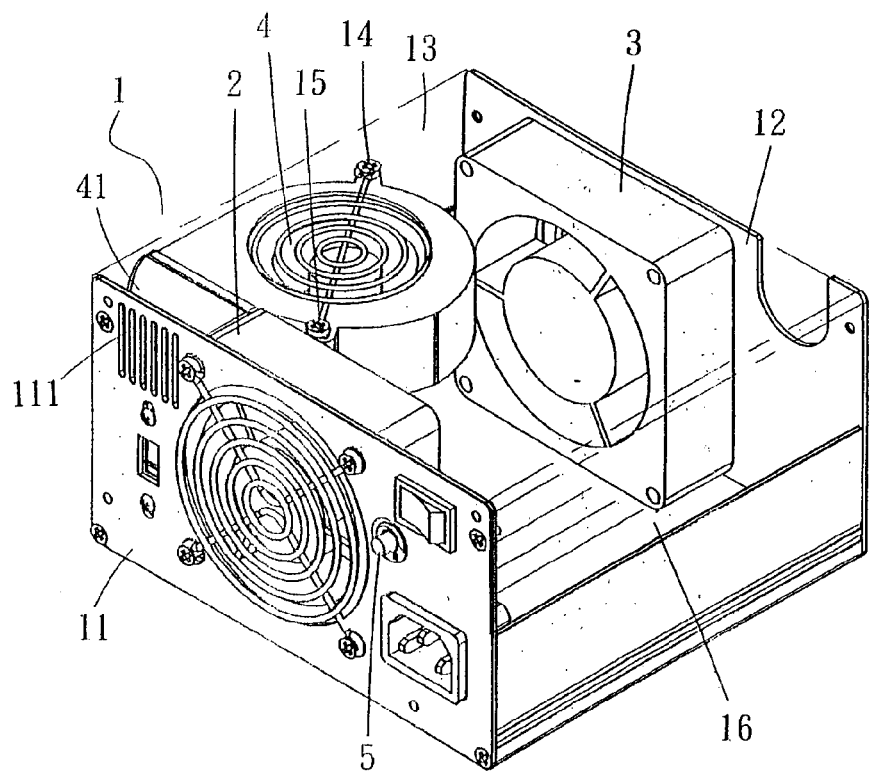
FIG. 2 is a rear, bottom perspective view illustrating an interior of the power supply capable of dissipating heat from the computer unit according to the present invention.
Figure 3:
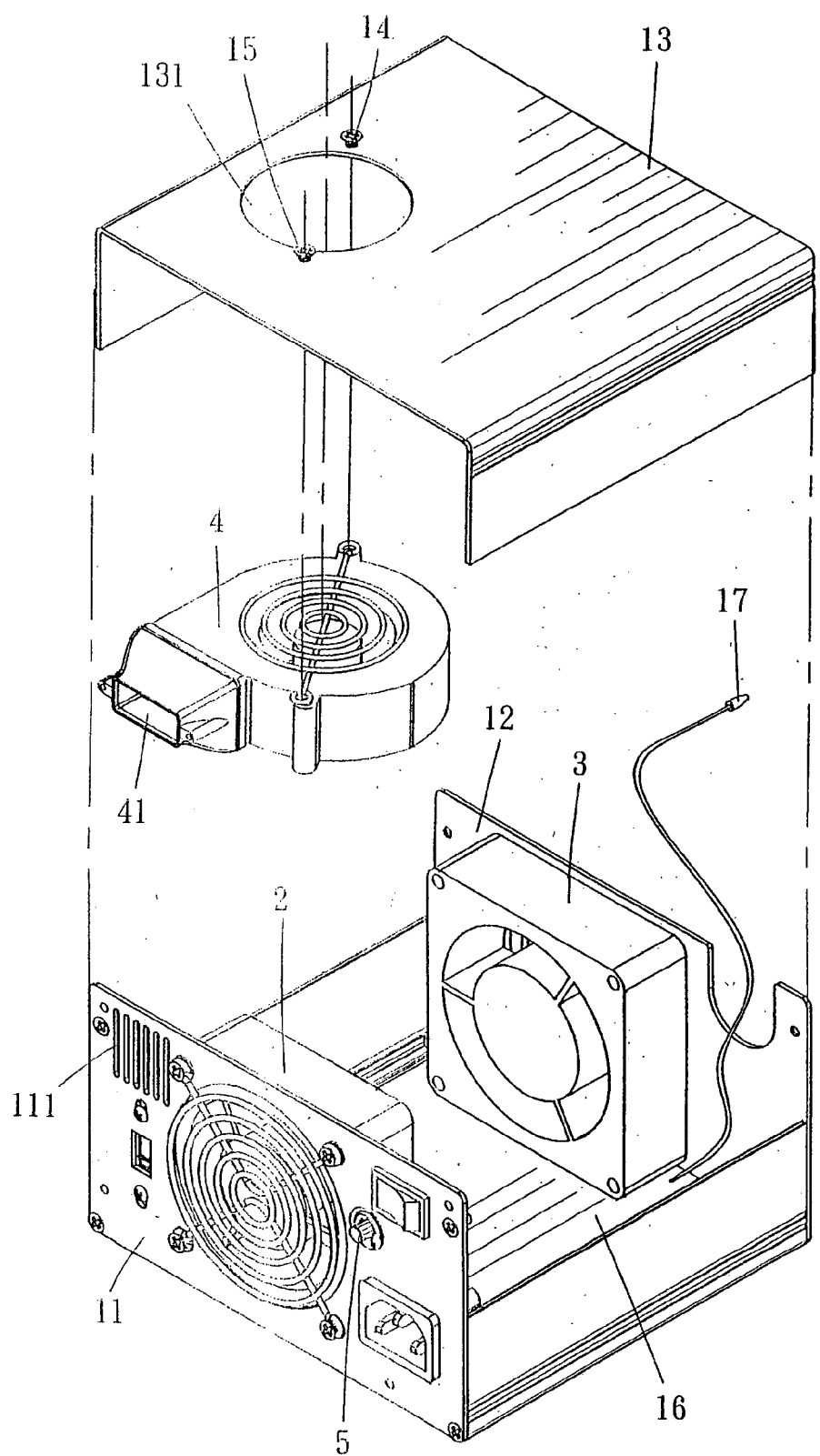
FIG. 3 is a rear, bottom, exploded perspective view of the power supply capable of dissipating heat from computer unit according to the present invention.

A power supply capable of dissipating heat from computer unit according to the present invention is as shown in FIGS. 1 to 3. The power supply 1 capable dissipating heat from a computer unit 6 provided on a front panel 11 and a rear panel 12 thereof with a pair of symmetrically arranged heat dissipating fans 2, 3, to generate linear convection. A casing 13 is provided at a bottom thereof with a through hole 131, into which a blower 4 is mounted. The front panel 11 is formed at a location corresponding to an exhausting hole 41 thereof with a vent hole 111. The blower 4 is mounted to an underside of the casing 13 of the power supply by means of screws 14, 15, to obtain the power supply 1 capable of dissipating heat from computer unit according to the present invention.

According to the present invention, a temperature-control chip is provided to a PCB 16, from with a temperature detecting unit 17 (which is simply illustrated as a detecting unit wire to omit plural power lines of the unit) is extended and then affixed into the computer unit 6 for monitoring the surrounding temperature.

Figure 4:
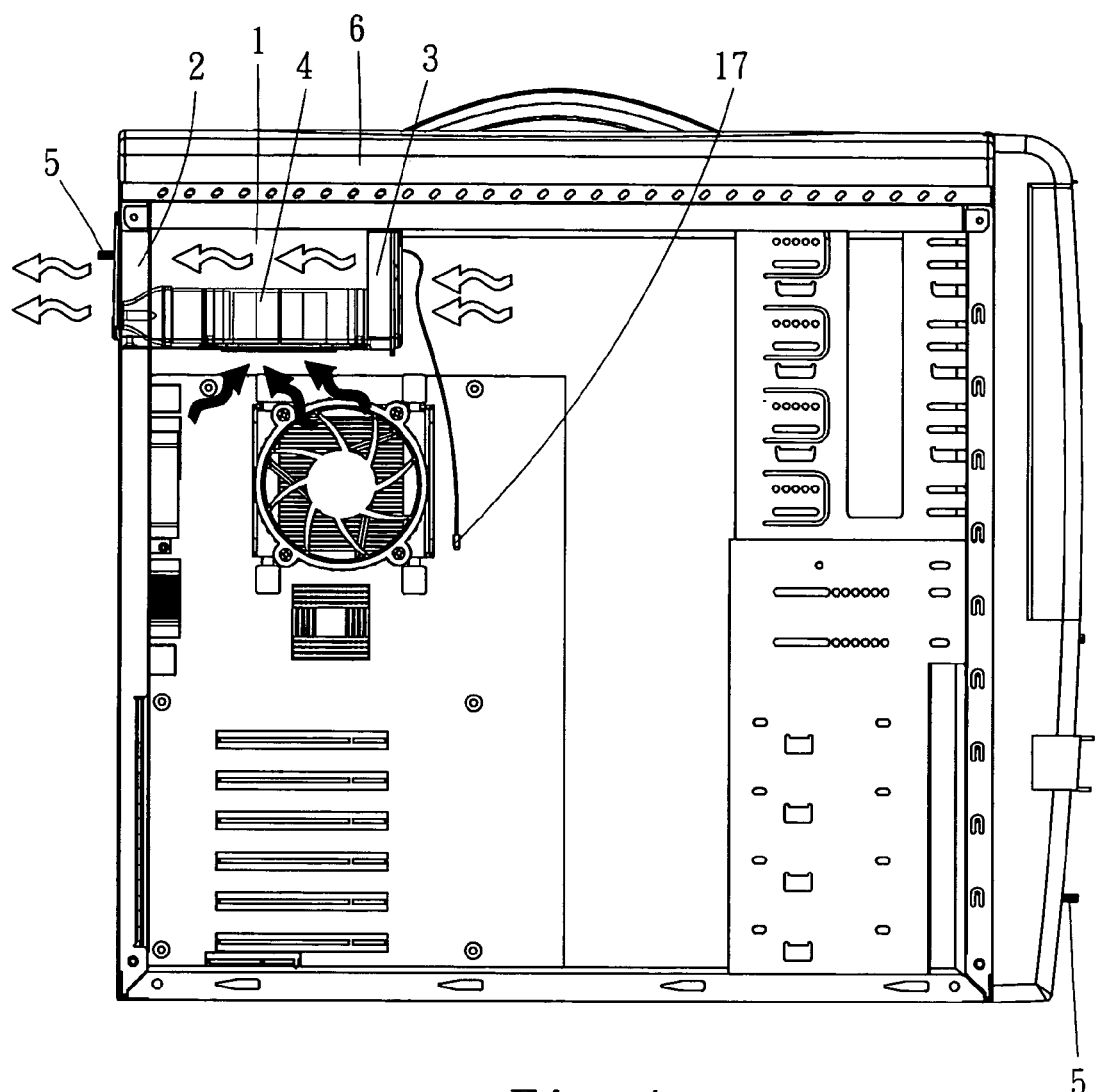
FIG. 4 is a side view illustrating an embodiment for the power supply capable of dissipating heat from computer unit according to the present invention.
Figure 5:
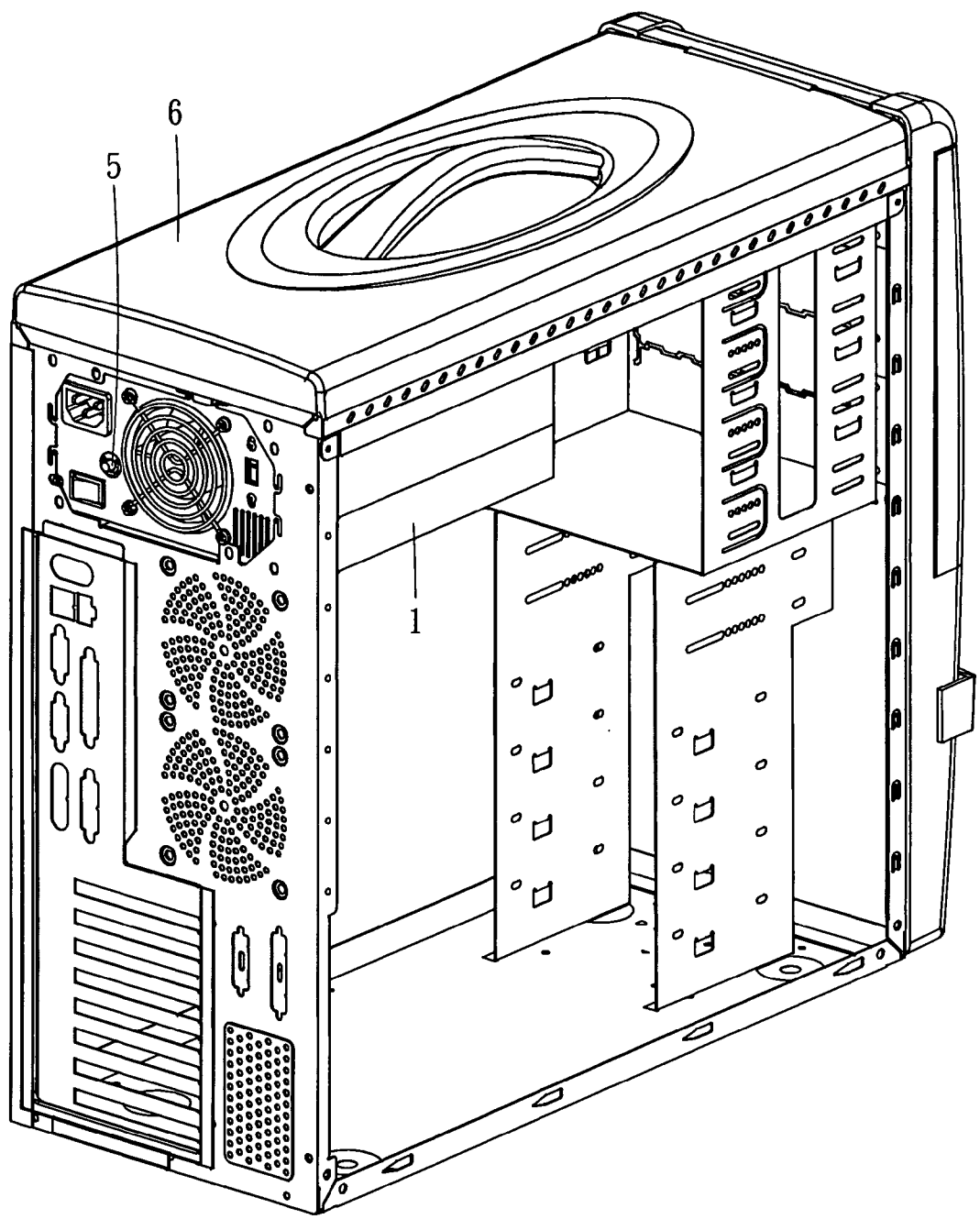
FIG. 5 is a perspective view illustrating an embodiment for the power supply capable of dissipating heat from computer unit according to the present invention.

As shown in FIGS. 4 and 5, an alternative blower 4 of the power supply 1 capable of dissipating heat from the computer unit according to the present invention is further provided with an adjustment knob 5 for adjusting and controlling the rotational speed of the blower 4. The adjustment knob 5 may be provided to a front of a body of the power supply 1, or to any other location on an exterior of the computer unit 6, to allow easy operation of the computer user to manually adjust the heat-dissipating rotational speed of the blower 4 via fingers from an outside of the computer unit.

According to the power supply 1 capable of dissipating heat from computer unit according to the present invention, a power terminal of the blower may be connected to a backup power provided within the power supply 1 capable of dissipating heat from the computer unit. The blower 4 is controlled by the temperature detecting unit 17 for monitoring the surrounding temperature to operate the blower 4 continuously after shutting off the computer unit 6 until the surrounding temperature has reached a target value, so as to remove residual heat of the CPU and within the computer unit 6 out of the computer unit.

Figure 6:
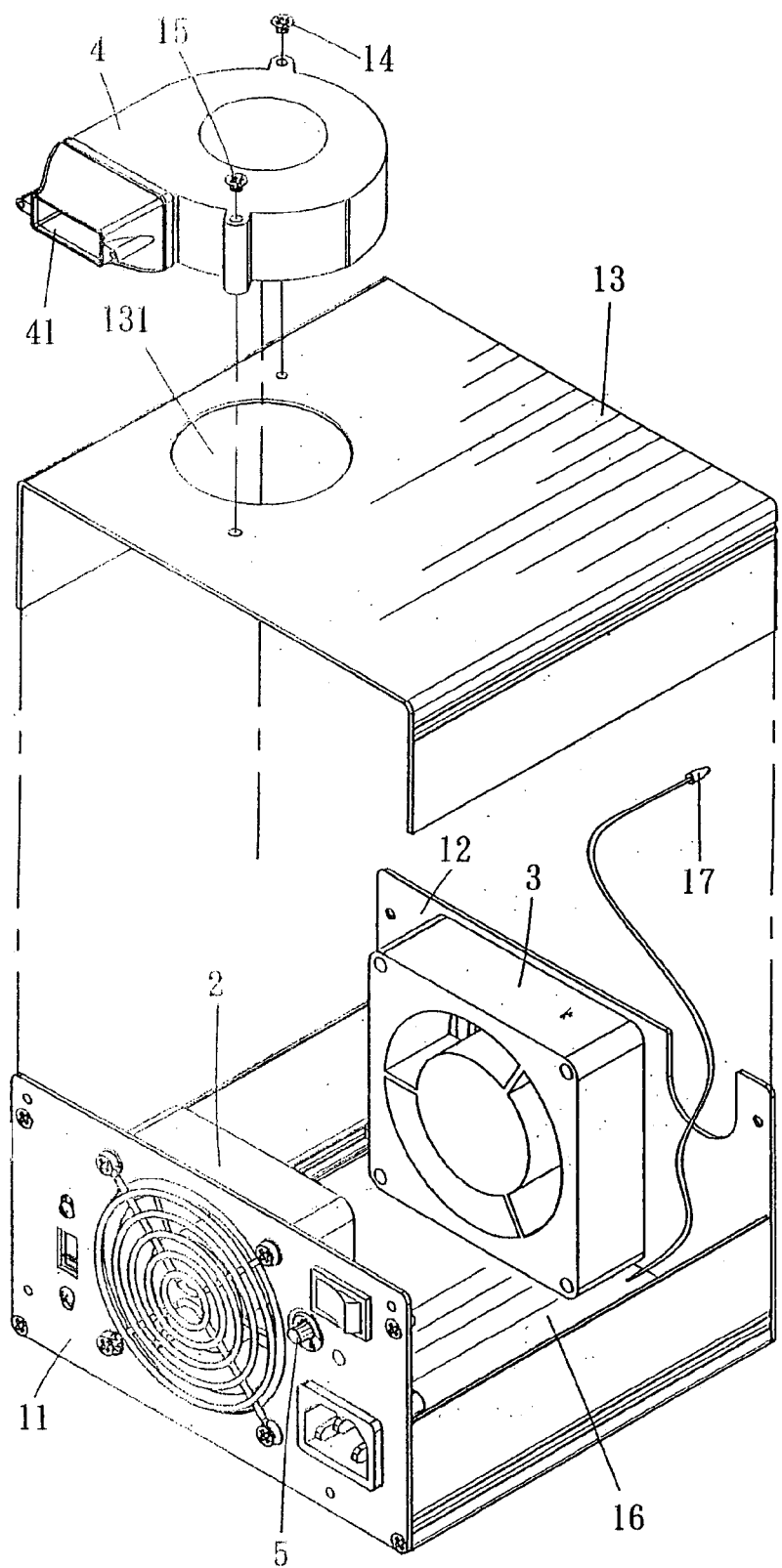
FIG. 6 is an exploded, perspective view of another embodiment for the power supply capable of dissipating heat from the computer unit according to the present invention.
Figure 7:
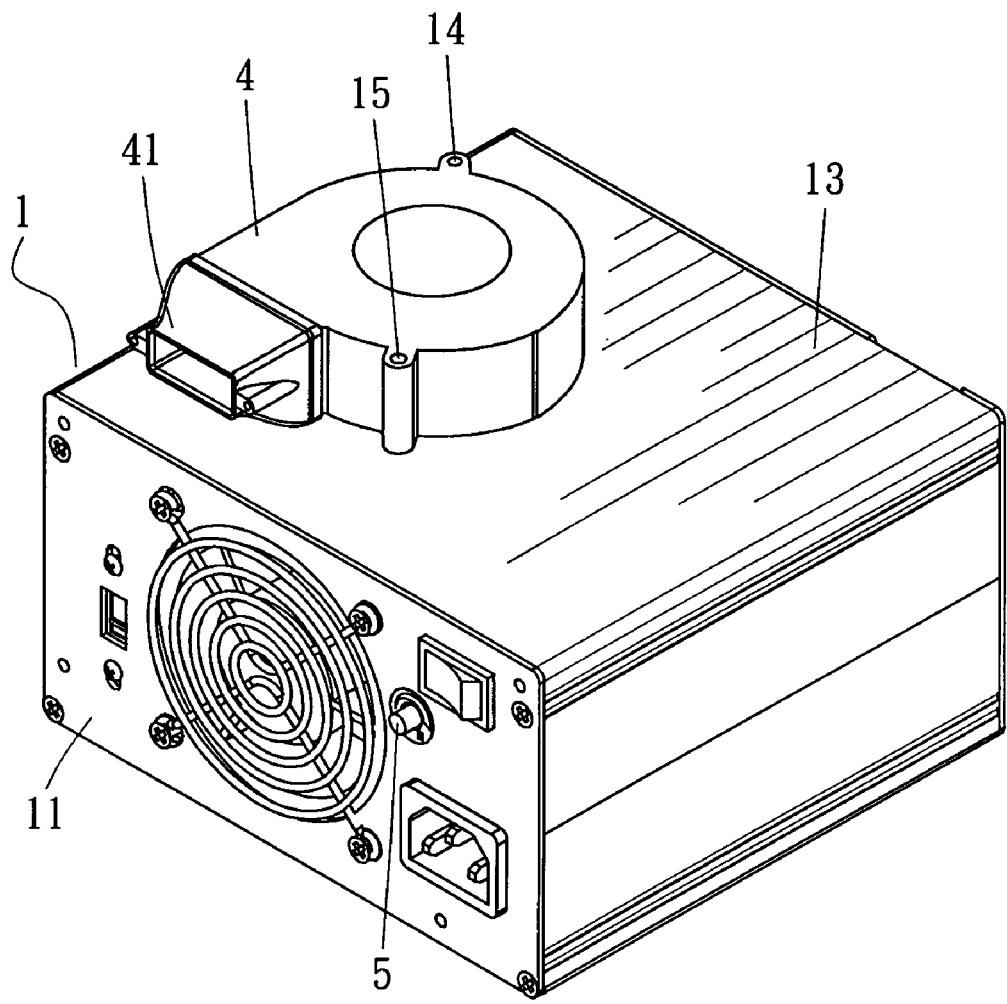
FIG. 7 is a perspective view of another embodiment for the power supply capable of dissipating heat from computer unit according to the present invention.

FIGS. 6 and 7 illustrate an alternative embodiment for the power supply capable of dissipating heat from the computer unit according to the present invention. In this invention, the blower 4 provided in the power supply 1 capable of dissipating heat from computer unit may also be provided to an appropriate location of an outer, upper edge of the power supply 1 capable of dissipating heat from computer unit to achieve the same heat-dissipating effect.

Accordingly, the power supply 1 capable of dissipating heat from computer unit according to the present invention is able to effectively remove heat source within the computer unit 6 by means of the specifically provided blower 4. The adjustment knob 5 of the blower 4 may also extend out of the power supply 1 capable of dissipating heat from a computer unit or out of the computer casing 6. The power terminal of the blower 4 may also be connected to a backup power of the power supply 1 capable of dissipating heat from computer unit, where a surrounding temperature monitoring device 17 controls the blower 4 to operate continuously after shutting off the computer until the surrounding temperature has reached a target value, so as to remove residual heat of CPU and within the computer unit 6 out of the computer unit.

What is claimed is:

1. A heat dissipating power supply system for a computer comprising:
   a) a power supply:
   b) a temperature detecting unit monitoring a temperature of the power supply;
   c) a first heat dissipating fan and a second heat dissipating fan located on the power supply; and
   d) a blower located on a top casing of the power supply, wherein the first heat dissipating fan and the blower exhaust airflows from separate outlets in a front panel of the power supply.

2. The heat dissipating power supply system according to claim 1, wherein the first heat dissipating fan is located on a front panel of the power supply, and the second heat dissipating fan is located on a rear panel of the power supply.

3. The heat dissipating power supply system according to claim 1, wherein the blower taking air in from an exterior of the power supply.

4. The heat dissipating power supply system according to claim 1, wherein the blower includes a power terminal.

5. The heat dissipating power supply system according to claim 1, wherein the temperature detecting unit controlling at least one fan selected from the group consisting of the first heat dissipating fan, the second heat dissipating fan, the blower, and a combination thereof to maintain a predetermined temperature in the computer.

6. The heat dissipating power supply system according to claim 1, wherein the blower includes an adjustment knob located on an exterior of one of the power supply and the computer.

7. The heat dissipating power supply system according to claim 1, wherein the blower is located on an exterior of the top casing of the power supply.

* * * * *